| United States Patent [19] | [11] Patent Number: 4,776,934 |
| --- | --- |
| Hoare | [45] Date of Patent: Oct. 11, 1988 |

[54] ELECTROLYTIC MACHINING ELECTROLYTE

[75] Inventor: James P. Hoare, Redford, Mich.

[73] Assignee: General Motors Corporation, Detroit, Mich.

[21] Appl. No.: 123,943

[22] Filed: Nov. 23, 1987

[51] Int. Cl.$^4$ ............................................... C25F 3/02
[52] U.S. Cl. ............................................... 204/129.95
[58] Field of Search ........................ 204/129.9, 129.95

[56] References Cited

U.S. PATENT DOCUMENTS 3,539,487  11/1970  Chartrand et al. ............. 204/129.95
3,669,858   6/1972  La Boda ......................... 204/129.75

Primary Examiner—T. M. Tufariello
Attorney, Agent, or Firm—Lawrence B. Plant

[57] ABSTRACT

An aqueous electrolytic machining electrolyte for iron-boron-neodymium/praseodymium alloys consisting essentially of alkali metal chlorates and dichromates wherein the chlorate ion concentration is at least about 2.5 molar and the ratio of the molar concentrations of the dichromate ion to the chlorate ion is about 0.033 to about 0.12.

1 Claim, 1 Drawing Sheet

ELECTROLYTIC MACHINING ELECTROLYTE

This invention relates to electrolytic machining neodymium/praseodymium-iron-boron alloys.

BACKGROUND OF THE INVENTION

A considerable amount of interest has recently been generated in permanent magnets made from alloys containing iron, boron along with neodymium and/or praseodymium. Such alloys typically contain about 6 to about 50 atomic percent neodymium and/or praseodymium, about 1 to about 10 atomic percent boron and about 50 to 90 atomic percent iron. Nickel or cobalt may be used to replace some of the iron. The alloys may also contain small amounts of such other elements as gallium, aluminum, silicon and manganese. In one particular species of such magnets, for example, ribbons of the alloys are made by a rapid solidification process (i.e., melt-spinning) in which the molten metal is ejected through an orifice onto the surface of a rapidly rotating disc (i.e., about 19 meters/sec) where the cooling rate can be as high as $10^6$ ° K./sec. The precise microstructure of the alloy depends on the cooling rate which is readily changeable by varying the surface velocity of the rotating disc. At high disc speeds (i.e., high quench rates), the alloys are amorphous with negligible intrinsic coercivity. At low speeds (i.e., low quench rates), the alloys contain large grains with low coercivity. Alloys having high coercivity comprise substantially spherical grains of $Nd_2Fe_{14}B$ (i.e., between 20 and 200 nm in diameter). The ribbons are coarsely ground and the particles hot-pressed at about 970° K. and about 100 MPa to form dense ingots wherein the grains of $Nd_2Fe_{14}B$ are surrounded by a thin layer of a Nd-rich, B-lean amorphous phase at the grain boundaries. Another technique for making magnets from such alloys involves sintering alloy powders which have been oriented and pressed in a magnetic field. Magnets made from such alloys are hard and brittle and require expensive diamond or cubic boron nitride tools for conventional machining. Even then, they are easily chipped and fractured.

Electrolytic machining is a well known process for shaping hard or brittle alloys which are otherwise difficult to machine. Electrolytic machining techniques are generally classified into one of two basic categories, namely electrolytic grinding and electrochemical machining and are essentially selective electrochemical corrosion processes. Electrolytic grinding is generally suited to metal removal operations ordinarily performed by cut-off wheels, saws, and grinding or milling machines and uses equipment similar in appearance to conventional cutting apparatus except for the electrical accessories. About 95 percent of the metal removal results from electrolytic rather than mechanical action. In its simplest form, electrolytic grinding is a process wherein an anodic workpiece is bathed in an electrolyte and an electric current passed therethrough to dissolve the surface of the workpiece. The resultant film of insoluble salts or oxides formed on the surface of the workpiece is then scraped away by a rotating cathodic grinding wheel. Electrochemical machining, on the other hand, relies solely on reaction product removal by means of electrochemical action and a rapid circulation of electrolyte in the region being cut. These processes are well known and are described in more detail in *Kirk & Othmer, Encyclopedia of Chemical Technology*, 3d Ed., Vol. 8, 751–762, John Wiley & Sons, 1979.

One of the problems in electrolytic machining processes is the uncontrolled anodic dissolution of the workpiece in unwanted areas resulting in undesirable tapering of holes, rounding of edges, and the like. This undesirable condition is often called "overcut". Overcut can occur even in low current density areas of the workpiece which are fairly well removed from the cathode. Overcut in low current density areas of the workpiece remote from the cathode can be reduced by the use of passivating electrolytes, such as sodium chlorate or perchlorate, which form passive films in the low current density regions of the workpiece such as described in LaBoda U.S. Pat. No. 3,669,858. The films are destroyed in the high current density regions where rapid metal removal rates are achieved along with very smooth machined surfaces. Electrolytic machining of neodymium/praseodymium-iron-boron alloys using sodium chlorate electrolytes, however, results in overcutting apparently due to the presence of the highly active neodymium and/or praseodymium in the alloys.

Accordingly, it is an object of the present invention to provide a unique passivating electrolyte tailored specifically for the electrolytic machining of neodymium/praseodynium-iron-boron alloys which electrolyte results in machined parts having minimal overcutting and smooth surface finishes. This and other objects and advantages of the invention will become apparent from the following description thereof.

THE INVENTION

The invention comprises an aqueous electrolyte for the electrolytic machining of neodymium/praseodymium-iron-boron alloys which electrolyte consists essentially of alkali metal (i.e., Na, K, Li) chlorate (preferably sodium) and alkali metal dichromate (preferably sodium) wherein the chlorate concentration is at least about 2.5 molar and the ratio of the molar concentrations of the dichromate to the chlorate is between about 0.033 to about 0.12. The dichromate presence in the chlorate will form a more passive film on the alloy than the chlorate alone. When the chlorate concentration falls below about 2.5 M, the conductivity of the solution is poor and insufficient surface passivation occurs. When the dichromate to chlorate ratio falls below about 0.033, the effect of the dichromate is masked by the effect of the chlorate and overcutting will occur. On the other hand, when the ratio of the dichromate to chlorate exceeds about 0.12 the electrolyte will so passivate the entire workpiece that electrochemical machining cannot proceed.

EXPERIMENTAL

Test electrodes were made by gluing pieces of $Nd_2Fe_{14}B$ ribbon to a Pt lead wire with conducting silver paint. After allowing the glued sample to dry over night, it was potted in molten polyethylene so that about 3 mm of the ribbon was exposed. A Teflon sleeve was slipped over the lead wire and sealed to the polyethylene. Two of these electrodes were sealed in the test side of a two-compartmented cell that had been filled with a pre-electrolyzed aqueous electrolyte comprising 2.75 M $NaClO_3$ and 0.18 M $Na_2Cr_2O_7$. The electrolyte was saturated with purified $N_2$ gas and the open circuit or rest potential (i.e., $-392.3$ V) was determined against a saturated calomel reference electrode (SCE). A steady-state polarization curve was determined on one electrode and a cyclic voltammogram on the other.

Figure 1:
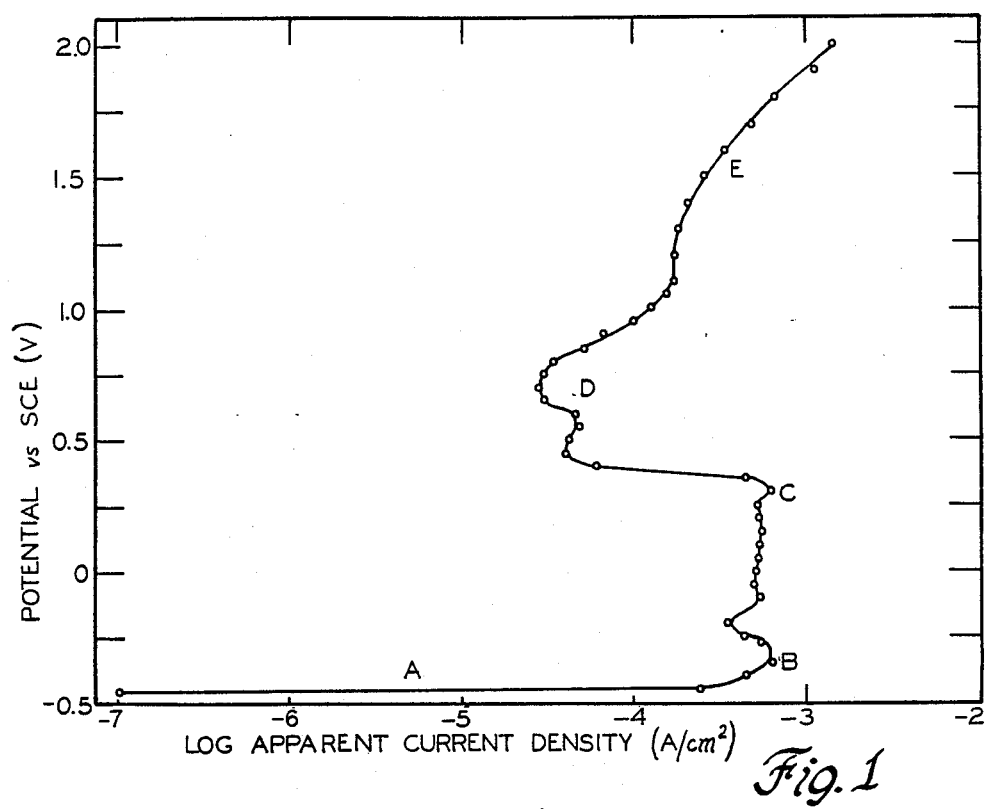
FIG. 1 is a steady-state polarized curve for an electrolyte in accordance with the present invention.
Figure 2:
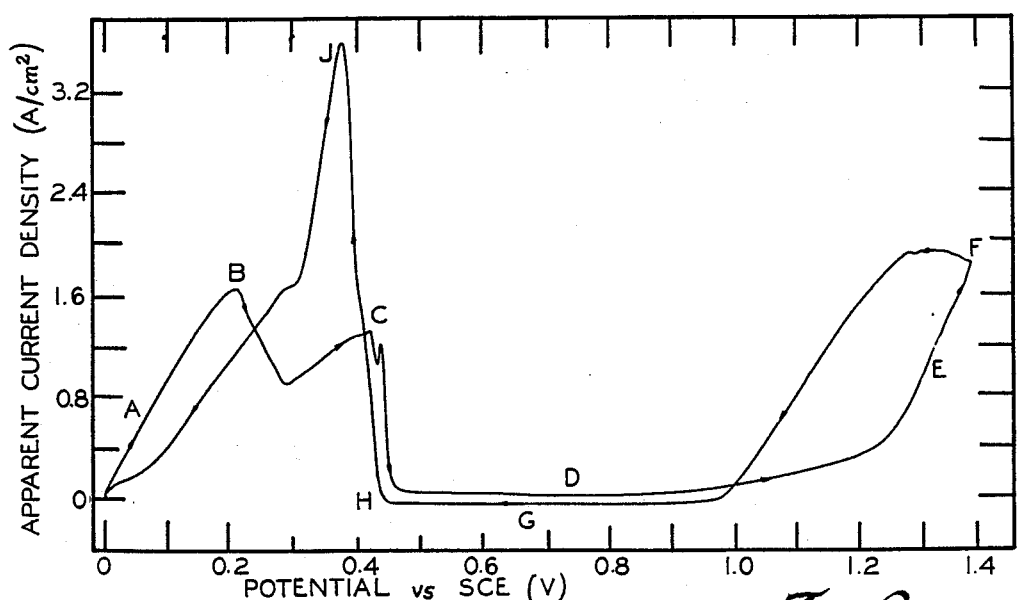
FIG. 2 is a cyclic voltammogram for the same electrolyte whose polarization curve is shown in FIG. 1.

The steady-state polarization curve is plotted in FIG. 1 and shows that the system is active in region A up to the point B where a porous, non-protective film is formed from the anodic corrosion of the Nd-rich, B-lean intergranular material. As the potential is increased, the $Nd_2Fe_{14}B$ alloy is exposed and a protective film is formed on the alloy surface at C. The system becomes electrochemically passive (i.e., a protective anodic film is formed) in D and finally transpassive in E (i.e., the protective anodic film breaks down) where machining takes place. The cyclic voltammogram is shown in FIG. 2. Metal dissolution occurs in region A, the porous film is formed at B, and the protective anodic oxide film is laid down on the surface at C. The system is passive in region D and becomes transpassive in region E where the passive film is removed. When the sweep direction is reversed at F there is a delay in reforming the passive film causing a hysteresis in the voltammogram before becoming passive once more in G. As the potential is made more cathodic in G the oxide film is reduced. When it is stripped away at H, the alloy is exposed again and metal is dissolved in the active region HJA.

While the invention has been disclosed primarily in terms of specific embodiments thereof it is not intended to be limited thereto but rather only to the extent set forth hereafter in the claims which follow.

The embodiments of the invention in which an exclusive property or privilege is claimed are defined as follows:

1. A process for electrolytically machining a selected area of an alloy comprising about 50 to about 90 atomic percent iron, about 1 to about 10 atomic percent boron and about 6 to about 50 atomic percent of a rare earth element selected from the group consisting of neodymium and praseodymium comprising the steps of establishing said alloy as the anode in an electrochemical cell, positioning an electrode adjacent to but closely spaced from said area to form a gap therebetween, flowing through said gap an aqueous electrolyte which forms an electrochemical erosion inhibiting film on the surface of the alloy which is decomposable at high current densities, and passing current through said alloy, electrolyte and electrode to decompose said film substantially only in said selected area immediately adjacent said electrode where electrolyte machining is to be effected, wherein said electrolyte consists essentially of alkali metal chlorates and dichromates in which the chlorate ion concentration is at least about 2.5 molar and the ratio of the molar concentration of the dichromate ion to the chlorate ion is about 0.033 to about 0.12 to minimize overcutting of the alloys in low current density areas of said alloy remote from said electrode incident to the presence of said neodymium and/or praseodymium thereat.

* * * * *